United States Patent Office 3,842,062
Patented Oct. 15, 1974

3,842,062
WATER-SOLUBLE COMPLEXES OF PROTEIN AND ANIONIC POLYELECTROLYTES SUCH AS SODIUM CARBOXYMETHYL CELLULOSE
Ernest Francis Eastman, Wilmington, Del., assignor to E. I. du Pont de Nemours and Company, Wilmington, Del.
No Drawing. Filed Sept. 27, 1972, Ser. No. 292,611
Int. Cl. A23c 5/00; A23j 1/20
U.S. Cl. 260—112 R                4 Claims

ABSTRACT OF THE DISCLOSURE

Water-soluble, essentially chemically neutral complexes of (1) protein which are at least dispersible in water, such as cheese whey protein, and (2) anionic polyelectrolytes selected from the group consisting of water-soluble salts of polymeric polyacids, such as sodium carboxymethylcellulose, and water-soluble polymeric polyacids, such as polyacrylic acid, said complexes having a thickening power, as a 2% aqueous solution, more than twice that of an equivalent physical mixture of the complex components, are prepared by neutralizing a water-insoluble complex, formed by reacting (1) a protein which is as least dispersible in water with (2) an anionic polyelectrolyte selected from the group consisting of water-soluble salts of polymeric polyacids and water-soluble polymeric polyacids in an acidic aqueous medium at a pH below the isoelectric point of the protein, with a water-soluble hydroxide in a solvent/water medium containing 55 to 99% by weight of water-miscible organic solvent and 1 to 45% by weight of water, and recovering the resulting water-soluble complex.

BACKGROUND OF THE INVENTION (1) Field of the Invention

This invention relates to complexes of proteins which are at least dispersible in water and anionic polyelectrolytes, and to the process of preparing them.

(2) Description of the Prior Art

Many water-soluble proteins are being discarded by today's technology. For example, in the preparation of cheese, milk is curdled in the presence of a suitable culture. The resulting solid is then separated from the liquid phase and further processed into cheese. The liquid phase, commonly called whey, which generally contains about 1% of water-soluble protein, is often discarded.

Complexes of proteins and anionic polyelectrolytes have been discarded heretofore in U.S. Pat. No. 3,407,076. Complexes of water-insoluble protein globulins and various anionic polyelectrolytes, for example, carboxyalkyl ethers of cellulose, starch, amylose, amylopectin, and natural gums, such as carboxymethylcellulose; anionic natural gums such as carrageenin; cellulose sulfate; and salts of alginic acid such as sodium alginate are described. These complexes are useful as a whipping aid in the preparation of whipped toppings.

In the Journal of Agricultural and Food Chemistry, Vol. 17, No. 5, pages 1089 to 1092, September-October, 1969, complexes of beta-lactoglobulin and anionic polyelectrolytes such as sodium carboxymethylcellulose, carrageenins and cellulose sulphate are described.

In the Journal of Dairy Science, Vol. 54, No. 6, June 1971, complexes of cheese whey protein and sodium carboxymethylcellulose are described. These complexes are prepared under acid conditions in aqueous medium whereby an insoluble precipitate is formed. Upon neutralization with NaOH the complex becomes soluble in water.

SUMMARY OF THE INVENTION

In accordance with this invention I have now discovered a water-soluble, essentially chemically neutral complex of (1) protein which is at least dispersible in water and (2) anionic polyelectrolyte selected from the group consisting of water-soluble salts of polymeric polyacids and water-soluble polymeric polyacids, said complex having a thickening power, as a 2% aqueous solution, more than twice that of an equivalent physical mixture of the complex components. This novel complex is prepared by the process which comprises neutralizing a water-insoluble complex, formed by reacting (1) protein which is at least dispersible in water with (2) anionic polyelectrolyte selected from the group consisting of water-soluble salts of polymeric polyacids and water-soluble polymeric polyacids in an acidic aqueous medium at a pH below the isoelectric point of the protein, by reacting it with a water-soluble hydroxide in a solvent/water medium containing 55 to 99% by weight of water-miscible organic solvent and 1 to 45% by weight of water, and recovering the resulting water-soluble complex.

DETAILED DESCRIPTION OF THE INVENTION

The complexes of this invention are derived from proteins which are at least dispersible in water and certain anionic polyelectrolytes. Suitable proteins for use in accordance with this invention include cheese whey protein, soy isolate protein, soy concentrate protein, tomato whey protein, and the like. These proteins should be at least dispersible in water. By "protein which is at least dispersible in water" it is meant protein which is water-soluble or at least capable of forming a stable dispersion in water.

The anionic polyelectrolytes which are useful in accordance with this invention are water-soluble salts of polymeric polyacids and water-soluble polymeric polyacids. By "polymeric polyacid" is meant a high molecular weight compound made up of one or more recurring structural units and containing a multiplicity of acid groups such as carboxylic acid groups, sulfuric acid groups, and the like. Suitable water-soluble salts of polymeric polyacids include alkali metal salts of carboxyalkyl ethers of cellulose, starch, amylose, amylopectin, and natural gums, for example, sodium carboxymethylcellulose, sodium carboxymethyl starch, sodium carboxymethyl amylose, sodium carboxymethyl amylopectin, sodium carboxymethyl guar gum, sodium carboxymethyl locust bean gum, and the like; natural sulphate-containing gums such as carrageenin; salts of alginic acid, for example, sodium alginate; and salts of cellulose sulphate such as sodium cellulose sulphate. Suitable water-soluble polymeric polyacids include polyacrylic and polymethacrylic acids, such as a polyacrylic acid homopolymer or a copolymer containing at least about 20% acrylic acid.

Sodium carboxymethylcellulose is the preferred anionic polyelectrolyte. Generally, sodium carboxymethylcellulose is available with a degree of carboxymethyl substitution of about 0.3 to 1.3. Preferably the degree of substitution is about 0.7 to 0.85.

The complexes of this invention are prepared by first preparing a water-insoluble complex of the protein and the anionic polyelectrolyte in an acidic aqueous medium at a pH below the isoelectric point of the protein. The isoelectric point of a protein is the pH at which the positive charges are balanced by the negative charges whereby the protein does not migrate to either the cathode or the anode when a direct current is passed through an aqueous solution or dispersion of the protein. In the case of most proteins, the pH at which the complex forms is about 2 to 5, and preferably about 2.5 to 4.

The process of forming the acidified complex may be carried out in a batch or continuous manner at a temperature of about 5 to 80° C., preferably at about 10 to 40° C., and most preferably at about room temperature. The weight ratio of protein to anionic polyelectrolyte is generally in the range of about 2:1 to 8:1. Preferably the protein/polyelectrolyte weight ratio is in the range of about 4:1 to 6:1. Any suitable means for controlling pH such as the addition of an organic or mineral acid may be used. However, in view of the potential used of the complex of this invention as a food, it is preferred to use a mineral acid such as hydrochloric or phosphoric acid.

The acidified complex is neutralized in accordance with this invention by reacting it with a water-soluble hydroxide in a solvent/water medium. Suitable water-soluble hydroxides include sodium, potassium, lithium and ammonium hydroxides. Sodium hydroxide is preferred. Sufficient hydroxide is used to render the complex essentially chemically neutral. By "essentially chemically neutral" is meant having a pH close enough to pH 7 that the complex is not significantly different in character from a completely neutral complex. Essentially chemically neutral complexes commonly have a pH of about 5 to 9, and most commonly about 6 to 8. The neutralized complex does not dissolve in the solvent/medium used in this step.

The neutralization step may be carried out in a batch or continuous manner at a temperature of about 5 to 80° C. Preferably the neutralization is carried out at a temperature of about 20 to 60° C.

The neutralization step is carried out by slurrying the complex in a solvent/water medium containing about 55 to 99% by weight of water-miscible organic solvent and about 1 to 45% by weight of water. Preferably, the medium contains about 60 to 80% by weight of water-miscible organic solvent and about 20 to 40% by weight of water. Any water-miscible organic solvent may be used as the solvent component of the medium. Suitable solvents include lower-alkyl alcohols such as ethyl alcohol, isopropyl alcohol, and tertiary butyl alcohol; lower-alkyl glycols such as ethylene glycol and propylene glycol; lower-alkyl ethers of ethylene glycol such as methyl cellosolve, cellosolve, and methyl cellosolve acetate; lower alkyl ethers of diethylene glycol such as carbitol, methyl carbitol, butyl carbitol and carbitol acetate; acetone; dioxane; tetrahydrofuran; N-methyl pyrrolidone; and the like. The preferred solvent is ethyl alcohol when the complex is intended for food uses.

Although it is not intended that this invention be limited to any particular theory, it is believed that neutralization of the complex in accordance with this invention may result in some form of renaturing of the complex whereby its physical characteristics are significantly altered. The neutralized complexes of this invention have thickening powers more than twice those of equivalent physical mixtures of the complex components when made up as 2% aqueous solutions. When the acidified complex is neutralized in aqueous medium, it assumes a thickening characteristic similar to that of a physical mixture of the complex components. There is evidence that the complexes of this invention dissociate to a much lesser degree than similar complexes which were neutralized in water.

After the complex has been neutralized, it may be recovered from the reaction medium by suitable means such as filtration, decantation, centrifugation, and the like. The recovered solid may then be washed, if desired, in a suitable medium such as an organic solvent or a solvent/water mixture in which it is insoluble. The complex, which should now be essentially chemically neutral, is again recovered by suitable means from the wash medium. The solids may then be dried, if desired, by any suitable technique such as air drying, oven drying or vacuum drying at temperatures of about 0 to 80° C., and preferably about 40 to 60° C.

The complexes of this invention are useful for thickening, emulsifying, and stabilizing food systems. The complexes of this invention have a much higher value-in-use than previous food thickeners such as sodium carboxymethylcellulose since they contribute to nutrition in addition to being significantly more functional as thickeners. They are also useful in industrial applications as flocculants and water clarification agents.

The following examples illustrating the novel complexes of this invention are given without any intention that the invention be limited thereto. All parts and percentages are by weight unless otherwise specified. All viscosities are Brookfield viscosities measured at 25° C.

EXAMPLE 1

(A) A protein/sodium carboxymethylcellulose (NaCMC)

complex was prepared by mixing an aqueous dispersion containing 2 parts of cheese whey protein with an aqueous solution containing 1 part of NaCMC (P–75–H, sold by E. I. du Pont de Nemours and Company) having a degree of carboxymethyl substitution of 0.75 and a Brookfield viscosity of 1500–2500 cps. measured as a 1% aqueous solution. Before mixing, both of the components were acidified to a pH of 3.2 using aqueous hydrochloric acid (HCl). After mixing for about 30 minutes at room temperature, the precipitate complex was recovered by centrifuging the slurry and freeze drying the dewatered solids.

Four grams of the water-insoluble 67/33 cheese whey protein/NaCMC complex was slurried for 60 minutes at room temperature in 100 grams of a 65/35 ethyl alcohol/water solution containing 23 cc. of 0.33 normal sodium hydroxide solution. Neutralized complex was separated by centrifuging and washed twice with a fresh 65/36 ethyl alcohol/water solution. After each wash cycle the neutralized complex was deliquified by centrifuging. After the second wash, the wet complex was neutral to pH paper. The wet neutralized complex was added to 100 grams of distilled water which resulted in a composition having the consistency of a gel. The gel was added to an excess of acetone to dehydrate it, after which the recovered solids were dried in air at room temperature. The recovered product weighed 3.0 grams and represented a 75% yield based on the weight of starting complex.

(B) For comparison, 3.0 grams of water-insoluble protein/NaCMC complex described in (A) above was slurried in 175 grams of distilled water. Sodium hydroxide solution (0.33N) was added dropwise until the complex was solubilized, at which time the solution had a pH of 10 and a Brookfield viscosity of 80 centipoises. The complex solution was added to 2000 cc. of acetone, after which the recovered solids were vacuum dried 24 hours at room temperature. The weight of recovered solids was 0.80 gram and represented a yield of approximately 27%, based on the weight of starting complex. These results indicate that more dissociation of the complex occurred when the neutralization was carried out in water.

EXAMPLE 2

(A) A protein/NaCMC complex was prepared by mixing 500 grams of a 1% solution of high viscosity NaCMC (P–75–H), described in Example 1) with 500 grams of a 5% protein solution obtained by dissolving spray dried cheese whey protein containing 35% protein and 65% lactose (ForeTein®–35, Foremost Foods) in water. Before mixing, each solution was adjusted to pH 3.0 with aqueous HCl. After 30 minutes mixing, the protein/NaCMC complex was washed with water, the solids were separated by centrifuging and then dried at 60° C. to a 5–7% moisture content. The complex analyzed for 11.2% nitrogen which is equivalent to 70.0% protein.

Water wet insoluble protein/NaCMC complex described above was slurried in a 80/20 acetone/water mixture. The pH of the slurry was adjusted to 7.2 with a 10% sodium hydroxide solution. The neutralized protein/NaCMC complex was filtered, washed with fresh 80/20 acetone/water mix, and then dried at 60° C. A 1% aqueous solution of this neutralized complex had a Brookfield viscosity of 1300 centipoises.

(B) For comparison, 2.08 grams of the water-insoluble protein/NaCMC complex described in (A) above was slurried in 198 grams of distilled water. The pH was adjusted to 7.5 with 10% aqueous sodium hydroxide. The resulting 1% aqueous solution had a Brookfield viscosity of 28 centipoises.

EXAMPLE 3

(A) An acidified-protein solution was prepared by adding 25 grams of soy isolate protein containing 96.5% protein on a dry basis (Promine® D, Central Soya Co.) to 475 cc. of distilled water and adjusting the solution pH to 3.0 by adding 80 cc. of 4.2% aqueous HCl. An acidified 1% NaCMC solution was prepared by dissolving 5 grams of NaCMC (P-75-H, described in Example 1) in 495 cc. of distilled water and adjusting the solution pH to 3.0 by adding 15 cc. of 1N HCl. The solutions were mixed with agitation, heated to 60° C., cooled to room temperature, and allowed to set overnight. The resulting slurry was then diluted with 2000 cc. of ethyl alcohol. The slurry of complex in the 60/40 alcohol/water mixture was divided into six 500 cc. aliquots. The aliquots were then titrated to the pHs indicated below using 10% aqueous sodium hydroxide solution. Neutralized solids were separated in each case by centrifuging, washed with ethanol, and dried. Two percent aqueous solutions of these solids were prepared.

| Aliquot | pH of aliquot | | 2% aqueous solution of recovered neutralized complex | |
| --- | --- | --- | --- | --- |
| | After titrating | After standing overnight | Brookfield viscosity, cps. | pH |
| 1 | 4.1 | 4.1 | 2 | 3.2 |
| 2 | 5.1 | 5.1 | 3 | 4.8 |
| 3 | 6.1 | 6.0 | 46 | 5.4 |
| 4 | 7.2 | 7.0 | 1,104 | 6.2 |
| 5 | 8.2 | 7.8 | 1,132 | 6.7 |
| 6 | 9.1 | 8.4 | 856 | 7.4 |

(B) For comparison, an acidified-protein solution was prepared by adding 75 grams of Promine® D to 1425 cc. of distilled water and adjusting the solution pH to 3.0 by adding 80 cc. of 4.2% aqueous HCl. An acidified 1% NaCMC solution was prepared by dissolving 15 grams NaCMC (P-75-H) in 1485 cc. of distilled water and adjusting the solution pH to 3.0 by adding 45 cc. of 1N HCl. The solutions were mixed with agitation, heated to 60° C., cooled to room temperature and allowed to set overnight. The precipitated protein/NaCMC complex was redispersed into a uniform slurry after settling overnight and divided into six 500 cc. aliquots. The aliquots were then titrated to the pHs indicated below using 10% sodium hydroxide solution.

| Aliquot | pH of aliquot | | Viscosity of 2% aqueous solution of neutralized complex, cps. | |
| --- | --- | --- | --- | --- |
| | After titrating | After 24 hrs. | Initial | After 24 hrs. |
| 1 | 5.2 | 5.3 | 223 | 225 |
| 2 | 6.2 | 6.2 | 182 | 215 |
| 3 | 7.3 | 7.1 | 195 | 307 |
| 4 | 8.3 | 8.2 | 80 | 114 |
| 5 | 9.3 | 9.1 | 103 | 138 |
| 6 | 11.6 | 11.5 | 24 | 24 |

EXAMPLE 4

An acidified-protein solution was prepared by adding 85 grams of Promine® D (described in Example 3) to 1415 grams of distilled water and adjusting the pH to 3 by adding 87 cc. of 1N HCl. An acidified 1% NaCMC solution was prepared by dissolving 15 grams of NaCMC (P-75-H, described in Example 1) in 1485 grams of distilled water and adjusting the solution pH to 3.0 by adding 43 cc. of 1N HCl. The solutions were mixed with agitation for four hours at room temperature, heated to 55° C., and then allowed to cool to room temperature and set overnight. After settling overnight, supernatant liquid was removed until 1400 cc. of solid/liquid mix remained in the reaction vessel. Isopropyl alcohol (2800 grams) then was added to the reaction vessel to give a 67/33 IPA/H$_2$O liquid phase. The insoluble protein/NaCMC complex was redispersed into a uniform slurry and divided into six aliquots. The aliquots were titrated to the pHs indicated below by adding 1N NaOH. Neutralized solids were separated by centrifuging and washed twice with ethyl alcohol. Recovered solids were dried two hours at 60° C.

| Aliquot | pH of aliquot | | 2% aqueous solution of recovered neutralized complex | |
| --- | --- | --- | --- | --- |
| | After titrating | After standing overnight | Viscosity, cps. | pH |
| 1 | 4.05 | 3.9 | 5 | 3.0 |
| 2 | 5.05 | 4.95 | 5 | 4.5 |
| 3 | 6.05 | 6.0 | 10 | 5.3 |
| 4 | 7.05 | 6.9 | 1,280 | 6.2 |
| 5 | 8.05 | 7.8 | 2,320 | 6.7 |
| 6 | 9.05 | 8.5 | 840 | 7.9 |

EXAMPLE 5

An acidified-protein solution and an acidified-NaCMC solution were prepared as described in Example 4. The solutions were mixed at room temperature with agitation for sixteen hours after which solids were allowed to settle. After settling, 1785 grams of supernatant liquid was decanted from the reaction vessel and replaced with an equal weight of tertiary butyl alcohol. The insoluble protein/NaCMC complex was redispersed into a uniform slurry and divided into six aliquots. The aliquots then were titrated to the pHs indicated below by adding 1N NaOH. Neutralized solids were separated by centrifuging and washed twice with ethyl alcohol. Recovered solids were dried 60 minutes at 60° C.

| Aliquot | pH of aliquot | | 2% aqueous solution of recovered neutralized complex | |
| --- | --- | --- | --- | --- |
| | After titrating | After standing overnight | Viscosity, cps. | pH |
| 1 | 4.0 | 3.8 | 2 | 3.2 |
| 2 | 5.0 | 4.9 | 5 | 4.9 |
| 3 | 6.0 | 5.9 | 15 | 5.6 |
| 4 | 7.0 | 6.85 | 430 | 6.6 |
| 5 | 8.0 | 8.0 | 915 | 7.3 |
| 6 | 9.0 | 9.0 | 860 | 8.7 |

EXAMPLE 6

(A) Sixty grams of an aqueous 25% polyacrylic acid solution (Acrysol® A-3, sold by Rohm and Haas Co.) was added to 1440 grams of distilled water. The pH of this solution was 3.05. An acidified-protein solution was prepared by adding 85 grams of Promine® D (described in Example 3) to 1415 grams of distilled water and adjusting the pH to 3.0 by adding 87 cc. of 1N HCl. The solutions were mixed with agitation at room temperature after which a white precipitate formed immediately and settled from solution. Two thousand grams of supernatant liquid was removed by decantation and replaced by an equal weight of ethyl alcohol. The insoluble protein/polyacrylic acid complex was redispersed into a uniform slurry and divided into six aliquots. The aliquots then were titrated to the pHs indicated below by adding 1N NaOH.

Neutralized solids were separated by centrifuging, washed twice with 67/33 ethyl alcohol/water, and dried at 60° C.

| Aliquot | pH of aliquot after titrating | 2% aqueous solution of recovered neutralized complex | |
|---|---|---|---|
| | | Viscosity, cps. | pH |
| 1 | 4.0 | 2 | 3.4 |
| 2 | 5.0 | 2 | 4.7 |
| 3 | 6.0 | 3 | 5.7 |
| 4 | 7.0 | 285 | 6.7 |
| 5 | 8.0 | 135 | 8.0 |
| 6 | 9.0 | 135 | 8.4 |

(B) For comparison, the solution viscosity of 4/1 physical blends of Promine® D/Polyacrylic acid (PAA) at pH 7 were the following:

| | Weight ratio of Promine® D/PAA | Viscosity, cps. |
|---|---|---|
| Solution conc., percent: | | |
| 1.0 | 0.8/0.2 | 8.5 |
| 2.0 | 1.6/0.4 | 15.5 |
| 3.0 | 2.4/0.6 | 25.0 |
| 5.0 | 4.0/1.0 | 45.0 |

EXAMPLE 7

(A) An acidified-protein solution was prepared as described in Example 6. An acidified-carrageenin solution was prepared by dissolving 15 grams of carrageenin (Seakem® 408, sold by Marine Colloids, Inc.) in distilled water and adjusting the pH to 3.0 with 1N HCl. The solutions were mixed with agitation and allowed to settle overnight. After standing overnight, the solids were separated by centrifuging and washed once with distilled water. The washed solids, in 1400 grams of water, were mixed with 3600 grams of ethyl alcohol. The mix was redispersed into a uniform slurry and divided into six aliquots. The aliquots then were titrated to the pHs indicated below with 1N NaOH. Neutralized solids were separated by centrifuging, washed with ethyl alcohol, and dried at 60° C. for one hour.

| Aliquot | pH of aliquot | | 2% aqueous solution of recovered neutralized complex | |
|---|---|---|---|---|
| | After titrating | After standing overnight | Viscosity, cps. | pH |
| 1 | 4.0 | 4.1 | 2 | 3.3 |
| 2 | 5.0 | 5.1 | 2 | 4.5 |
| 3 | 6.0 | 6.05 | 2 | 5.5 |
| 4 | 7.0 | 7.1 | 13 | 6.0 |
| 5 | 8.0 | 7.9 | 205 | 7.1 |
| 6 | 9.0 | 8.6 | 56 | 8.1 |

(B) For comparison, the solution viscosity of 4/1 physical blend of Promine® D/Seakem® 408 at essentially neutral pH were:

| | Weight ratio of Promine® D/Seakem®408 | Viscosity, cps. |
|---|---|---|
| Solution conc., percent: | | |
| 1.0 | 0.8/0.2 | 8 |
| 2.0 | 1.6/0.4 | 15 |
| 3.0 | 2.4/0.6 | 34 |
| 5.0 | 4.0/1.0 | 210 |

EXAMPLE 8

(A) An acidified-protein solution was prepared as described in Example 6. An acidified-alginate solution was prepared by dissolving 15 grams of 100% unmodified sodium alginate (Kelcosol®, sold by Kelco Co.) in 2500 grams of distilled water and adjusting the pH to 3.0 with 1N HCl. The solutions were mixed with agitation and allowed to settle overnight. After standing overnight, 1500 grams of supernatant liquid were removed by decantation and replaced by 5400 grams of ethyl alcohol. The mix was redispersed into a uniform slurry and divided into six aliquots. The aliquots then were titrated to the pHs indicated below with 1N NaOH. Neutralized solids were separated by centrifuging, washed with ethyl alcohol, and dried at 60° C. for one hour.

| Aliquot | pH of aliquot | | 2% aqueous solution of recovered neutralized complex | |
|---|---|---|---|---|
| | After titrating | After standing overnight | Viscosity, cps. | pH |
| 1 | 3.6 | 3.6 | 5.5 | 3.5 |
| 2 | 4.2 | 4.2 | 1,500 | 4.25 |
| 3 | 5.0 | 5.0 | 650 | 4.8 |
| 4 | 7.0 | 6.8 | 610 | 6.2 |
| 5 | 8.0 | 7.5 | 465 | 7.1 |

(B) For comparison, the solution viscosity of 4/1 physical blend of Promine® D/Kelcosol® at essentially neutral pH were:

| | Weight ratio of Promine® D/Kelcosol® | Viscosity, cps. |
|---|---|---|
| Solution conc., percent: | | |
| 1.0 | 0.8/0.2 | 31 |
| 2.0 | 1.6/0.4 | 150 |
| 3.0 | 2.4/0.6 | 440 |
| 5.0 | 4.0/1.0 | 1,480 |

Although the invention has been described and exemplified by way of specific embodiments, it is not intended that it be limited thereto. As will be apparent to those skilled in the art numerous modifications and variations of these embodiments can be made without departing from the spirit of the invention or the scope of the following claims.

I claim:

1. A method of preparing a water-soluble, essentially chemically neutral complex which comprises neutralizing a water-insoluble complex, formed by reacting (1) protein which is at least dispersible in water with (2) sodium carboxymethylcellulose, the weight ratio of protein to sodium carboxymethylcellulose being 2:1 to 8:1, in an acidic aqueous medium at a pH below the isoelectric point of the protein, by reacting said water-insoluble complex with a water-soluble hydroxide in a solvent/water medium containing 55 to 99% by weight of water-miscible organic solvent and 1 to 45% by weight of water, and recovering the resulting water-soluble complex.

2. The method of Claim 1 wherein the protein is cheese whey protein.

3. The method of Claim 2 wherein the water-soluble organic solvent is a lower alkyl alcohol and the water-soluble hydroxide is sodium hydroxide.

4. The method of claim 3 wherein the medium contains 60 to 80% alcohol and 20 to 40% water.

References Cited

UNITED STATES PATENTS

| | | | |
|---|---|---|---|
| 2,430,180 | 11/1947 | Le Gloahec | 260—123.7 U X |
| 2,824,092 | 2/1958 | Thompson | 260—117 |
| 2,922,749 | 1/1960 | Snyder et al. | 195—68 X |
| 3,001,876 | 9/1961 | Loewenstein | 99—14 X |
| 3,069,327 | 12/1962 | Eldridge et al. | 260—123.5 X |
| 3,407,076 | 10/1968 | Ganz | 260—112 X |

OTHER REFERENCES

J. Biol. Chem. 138 (1941), pp. 501–506, Meyer et al.
J. Dairy Science, Vol. 52, No. 8, 1969, pp. 1181–1185.
Biochem. J. Vol. 43, pp. 387–397, Partridge.
Biochimica et Biophysica Acta, Vol. 22 (1956). No Guchi.
J. Dairy Science, Vol. 54, No. 6, 1971, Hansen et al., pp. 830–834.

HOWARD E. SCHAIN, Primary Examiner

U.S. Cl. X.R.

260—123.5; 426—150, 188, 359